July 12, 1927.　　　　　O. L. GILLILAND　　　　　1,635,403
TREAD CHAIN FOR TRACTORS
Original Filed June 25, 1920　　3 Sheets-Sheet 2
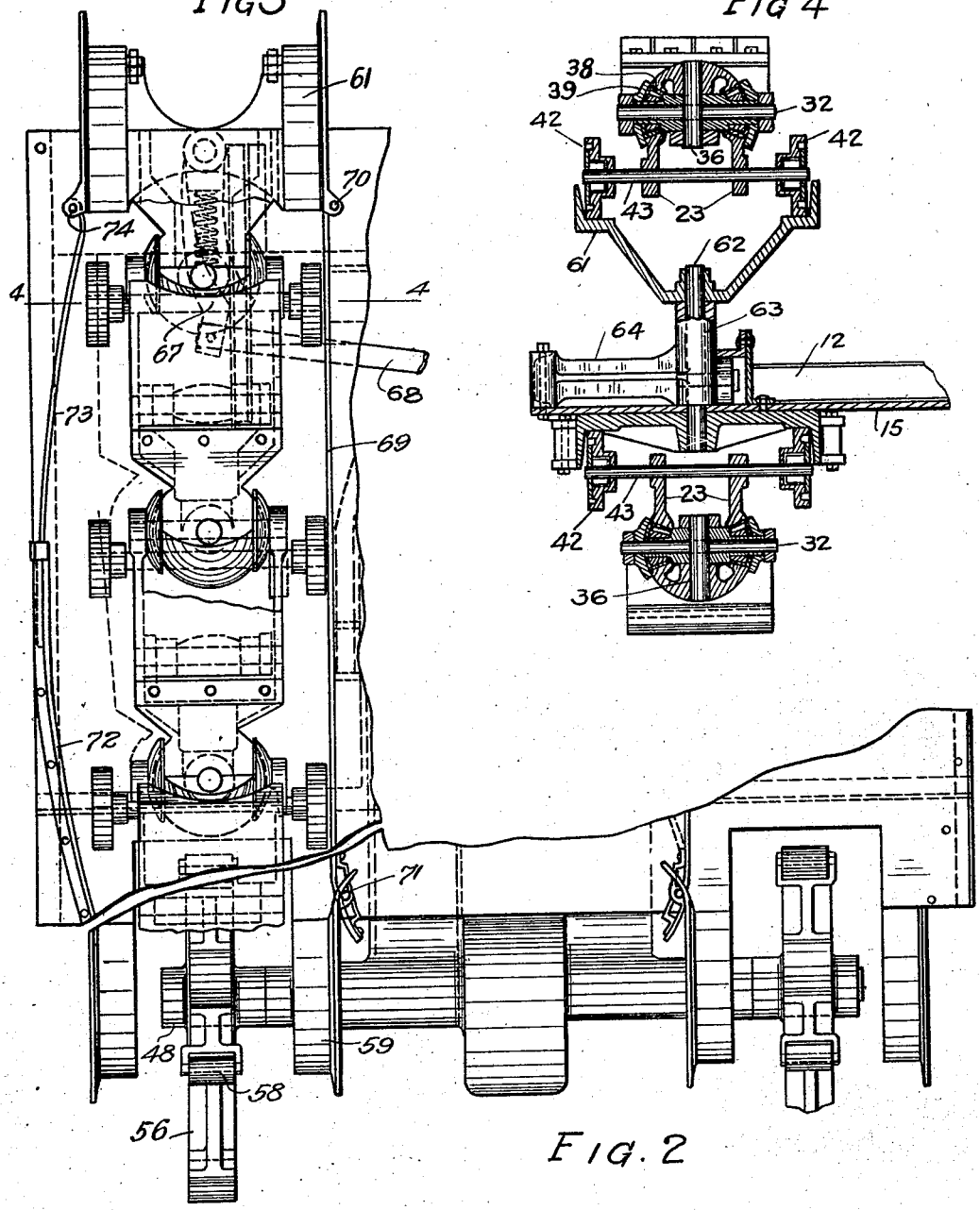
INVENTOR
O. L. GILLILAND
BY HIS ATTORNEY
James F. Williamson

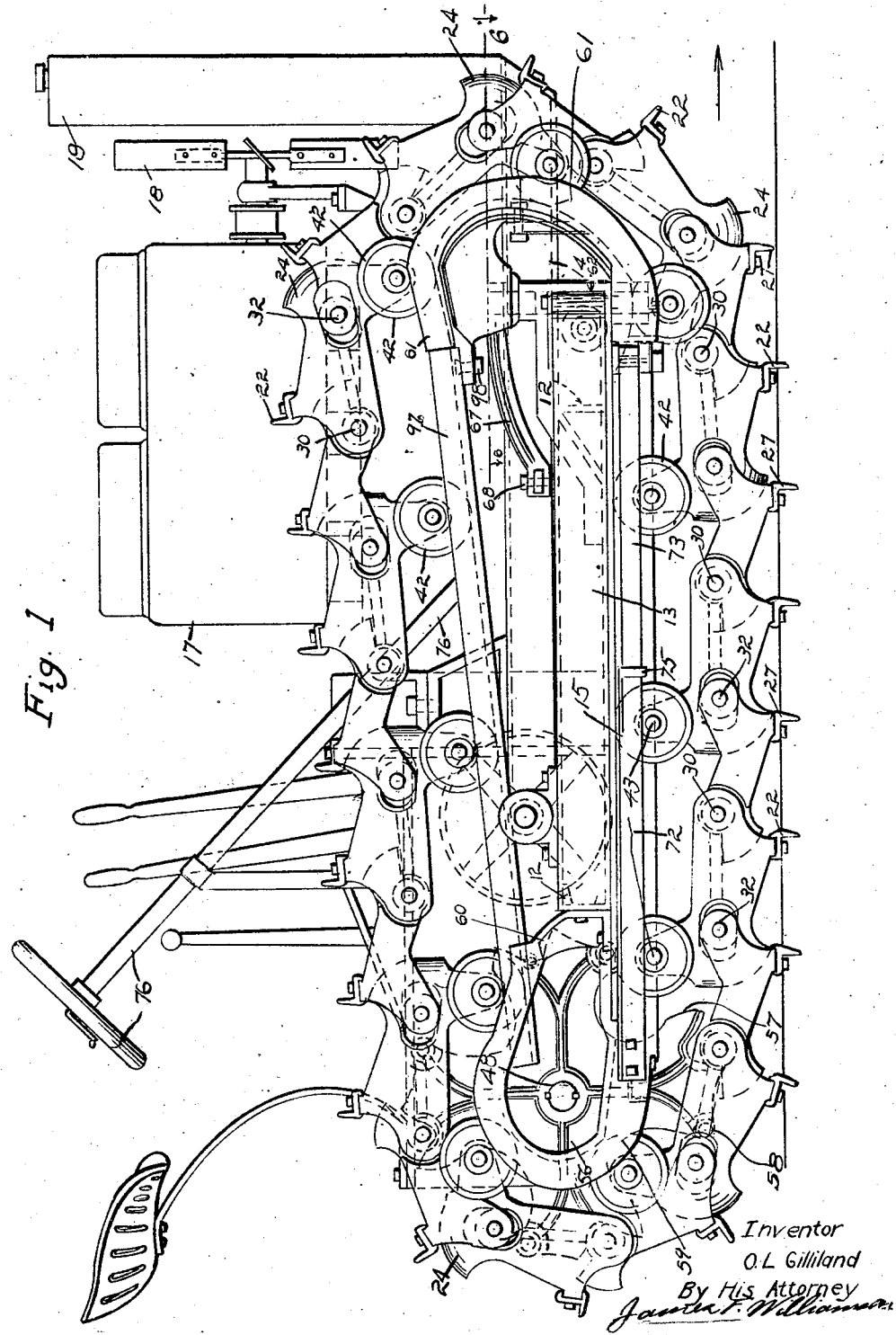

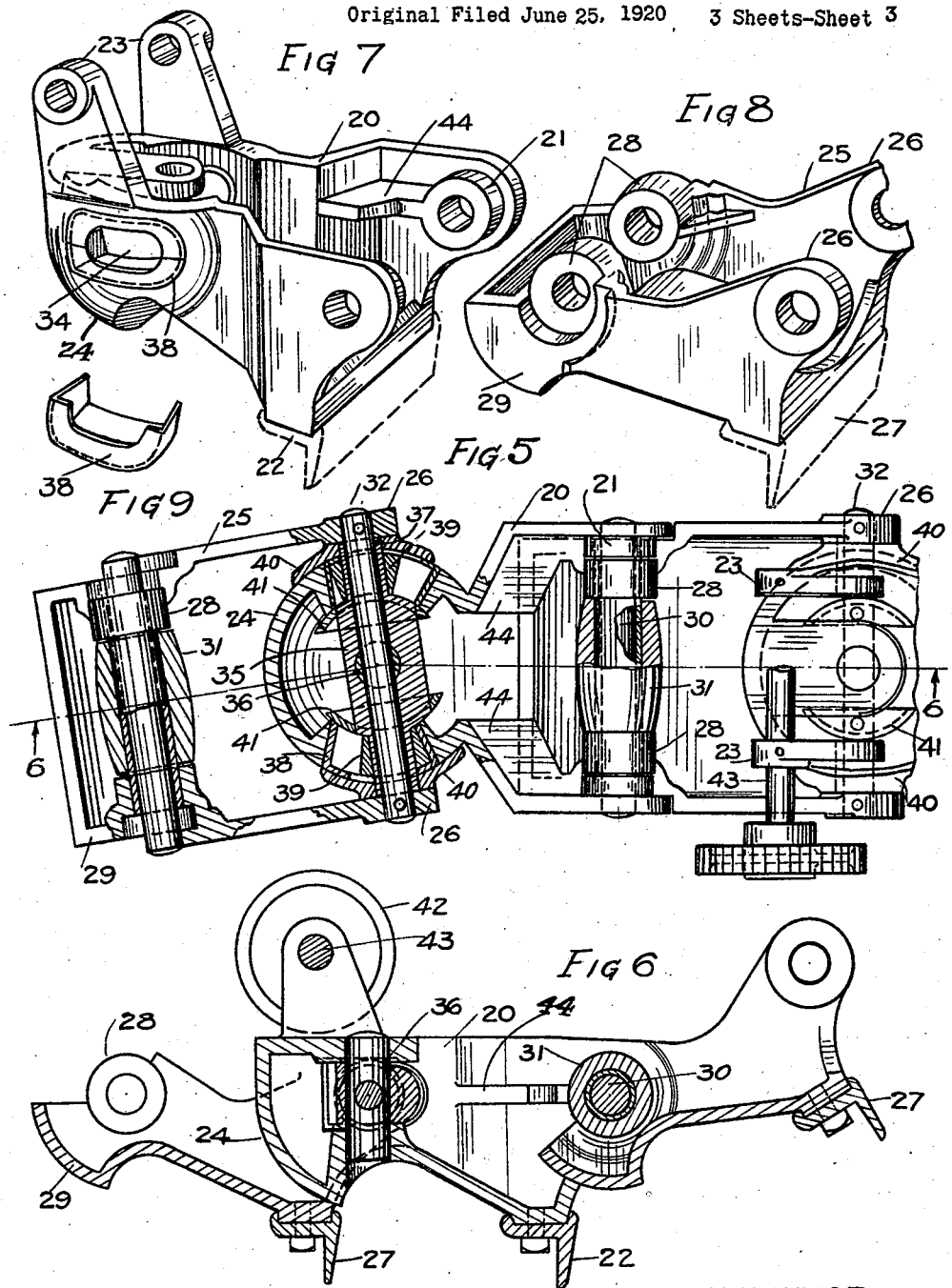

Patented July 12, 1927.

1,635,403

UNITED STATES PATENT OFFICE.

ORRA L. GILLILAND, OF MINNEAPOLIS, MINNESOTA, ASSIGNOR OF ONE-FIFTH TO E. LUTHER MELIN, OF MINNEAPOLIS, MINNESOTA.

TREAD CHAIN FOR TRACTORS.

Original application filed June 25, 1920, Serial No. 391,724. Divided and this application filed November 12, 1921. Serial No. 514,618.

This invention relates to tractors of the traction belt or chain type and is particularly directed to the novel traction chain or endless track used with such a tractor.

This application is a division of my copending application for "tractor", filed June 25th, 1920, S. N. 391,724, which matured into Patent No. 1,436,651.

It is an object of this invention to provide a highly improved track or tread chain so constructed that the tread chain may be bent laterally and laid to form a curved automatically laid track over which the tractor will run. In carrying out this invention, the links of the tread chains are equipped with wheels or rollers and the frame of the tractor is provided with a roller runway, the lower portion of which runs as a shoe over the rollers of the lower chain links. Also, the lower portion of the roller runway is provided with side flanges that are arranged to be bent to cause the tractor to follow the curvature of the tread chain when the latter is laid on the line of a curve. Of course, in running straight ahead, the tread chains will be laid straight upon the ground and the the side flanges of the shoe or lower part of the roller runway will then be straight.

The chains above noted are in laterally spaced pairs and the tractor is driven forward by large sprocket-like wheels that engage the tread chain at the rear portion thereof and run forward on the lower ground-engaged links to push the tractor forward. The upper and lower portions or runs of the roller runways are connected by curved front and rear sections, the former of which are caused to push their way forward against the rollers of the downwardly moving forward links of the chains.

Other objects and advantages of the invention will be apparant from the following description made in connection with the accompanying drawings in which like reference characters refer to the same parts throughout the different views, and in which Fig. 1 is a side elevation of a tractor with a tread chain applied thereto;

Fig. 2 is a plan view of the driving sprocket end of the tractor, the tread chains being removed;

Fig. 3 is a bottom plan view of one side of the tractor;

Fig. 4 is a transverse vertical section taken approximately on the line 4—4 of Fig. 3;

Fig. 5 is a view partly in plan and partly in horizontal section showing several of the lower links of one of the tread chains;

Fig. 6 is a vertical section taken on the line 6—6 of Fig. 5;

Figs. 7 and 8 are perspective views showing two adjacent links of the tread chain;

Fig. 9 is a perspective view showing one section of an elongated bushing used in the swiveled connections of the tread chains.

Referring to the drawings, in Fig. 1 is shown a tractor having a framework comprising outside longitudinal beams 13, transverse channel beams 12 and a platform 15 which extends between the said beams, all of which parts are preferably of metal and rigidly connected together.

A multicylinder combustion engine indicated as an entirety by the numeral 17 is mounted on the frame, the crank shaft of which engine extends longitudinally of the frame. This engine has the customary fan 18 and radiator 19, the latter being shown as secured to the front end of a frame designated as 14.

The two tread chains used in this tractor are, as already indicated, of novel construction, and each such tread chain, as preferably designed, comprises two types of links, such as shown in Figs. 7 and 8. These two types of links are alternated and coupled to form endless tread chains. The links 20, shown in detail in Fig. 7, are cast hollow and are provided at one end with laterally spaced perforated ears 21 and outstanding traction cleats 22, and at their other ends are provided with laterally spaced ears 23 and with approximately spherical hollow heads 24. The links 25 shown in Fig. 8 are provided at one end with laterally spaced perforated ears 26 and traction cleats or lugs 27, and at their other ends, are provided with laterally spaced perforated ears or lugs 28 and with segmental heads 29.

When the two types of links 20 and 25 are put together, the ears 28 of the links 25 are between the ears 21 of the links 20 and the links are then coupled together by coupling pins 30, and sprocket-engaging rollers 31 are mounted on the said pins between said ears 28; and the spherical heads 24 of the links 20 are between the ears 26 of the links 25 and coupling pins 32 are passed through said ears 26 and through elongated slots 34 formed in the sides of the spherical heads 24. Pivotally mounted on the central portion of each pin 32 and located, one within each spherical head 24 is a knuckle block 35 that is coupled centrally to the front end of the co-operating link 20 by a short vertical pivot pin 36. These pins 36 afford the pivots on which the links move when they are laid to form a curved track. The knuckle blocks 35 are provided with sleeve extensions 37 that extend through the slots 34. Here it should be noted that the slots 34 are of inwardly tapered form and are preferably lined with two-part bushings 38 that are flanged at one of their outer extremities. Working in the bushings 38 and loosely journaled on the sleeve extensions 37 are conical rollers 39. Concave dust caps 40 are placed on the outer ends of the sleeves 37 between the ears 26 and the heads 24 and serve to keep the segmental slots 34 always closed.

Also, inner dust caps 41 secured to the blocks 35 keep the inner extremities of the slots 34 always closed.

The ears 23 of the links 20 support bearing rollers or wheels 42 that are journaled on axle pins 43 carried by said lugs 23. These rollers 42, as will be presently noted, run in the above noted runways carried by the tractor frame. The segmental heads 29 of the links 25 are adapted, under conditions hereinafter noted, to engage against stop flanges 44 on the interiors of the links 20 (see Figs. 1 and 6).

To the outer ends of the sections of the divided rear axle 48 are secured large and heavy sprocket-like wheels 56 formed with incut notches 57 to receive the chain rollers 31, and provided with peripherally spaced rollers 58, to engage against the knuckle blocks 35 of the tread chain (see Figs. 1 and 3).

The two tread chains described, as already indicated, run, one over each of the tread sprocket-like wheels 56, and extend forwardly therefrom with their bearing rollers or wheels 42 inward in position to engage with the roller runways which will now be described.

These two runways are alike and may be described separately. The rear portion of the chain runway is in the form of a bifurcated U-shaped channel 59, both prongs of which are integral with, or otherwise rigidly secured to a short pedestal bracket 60 which, in turn, is rigidly secured to the platform and cross beam 12 of the tractor frame. The outside portion of the platform or plate 15 forms a horizontal forward extension of the channel of the lower run of the U-shaped channel or yoke 59 and the rollers 42 of the links that are engaged with the ground will directly engage with the under surface or portion of said platform or bearing plate.

The front portions of the two chain runways are afforded by bifurcated U-shaped or yoke-like channels 61 that align with the rear fixed yokes 59. The lower portions of the said two yokes 59 and 61 will guide the rollers 42 against the under surface of the deck or platform 15. The yokes 61, by vertical pivot pins 62, are pivoted to sleeves 63 on the inner ends of horizontal arms 64, the outer ends of which arms are pivoted to the platform or deck 15 or other fixed adjacent frame structure. The yokes 61 are provided with rigidly attached rearwardly extended arms 67 that are cross connected by a link 68, operated, as hereinafter described.

Each of the two chain runways above described, on the underside of the deck or platform 15, is provided with inside and outside so-called guard rails. The inside guard rails 69 (see particularly Fig. 3) are flat flexible bars pivotally connected at their front ends at 70 to the lower inside portions of the respective yoke 61. The rear ends of the said inside rails 69 are connected to the lower inside portions of the rear yokes 59, by sliding pivotal connections shown at 71.

The outside guard rails comprise curved fixed sections 72 and curved movable sections 73. The sections 73 are pivotally connected at 74 to the lower outside portions of the yoke 61 and will have a slidable connection with the ends of the sections 72 at 75.

The steering wheel and post 76 is shown and the machine is steered by giving oscillatory movements to the front yokes 61 and by bending or deflecting the guard plates 69. When it is desired to cause the machine to turn to the right, the steering wheel and post will be turned in the direction to cause the yoke 61 to swing to the right, and, likewise, to turn the machine to the left when the yokes are turned in that direction.

As best shown in Figs. 1 and 2, laterally spaced pairs of upper wheel or roller guiding rails 97 are pivotally connected at 98 to the upper prongs of the respective yokes 61, and the rear ends of these upper rails 97 have slidable connection to the upper prongs of the rear yokes 59, so that the said rails 97 will guide the chain rollers or wheels 42 on their upward line of travel from the rear yokes to the front yokes.

The tractor illustrated is designed especially as a quite small tractor, and hence, the main chain roller guiding surfaces afforded by the deck or platform 15 are rigid, the one in respect to the other; but for large tractors there would preferably be a flexible connection between these two main guiding elements, so that the two chains will independently adapt themselves to irregularities in the road or ground.

In respect to the construction of the tread chains, it will be noted that they are flexible in a vertical plane and also in horizontal planes, so that they are free to travel around the driving sprockets to the front and rear yokes and to adapt themselves to the lateral curvature of the lower chain guides for steering purposes.

Nevertheless, the said chains are rigid against twisting movements, that is, the one link cannot rotate or turn on an axis that is longitudinally of the chain. In the lower portions of the tread chains, the load strain is evenly distributed between those links that are on the ground. When the front yokes 61 are set at an angle for turning, the tread chain links that are in contact therewith will, of course, be positively moved into angular positions, and the links, as they are brought into contact with the ground, will be set at the proper angle on the curve that is to be traveled, so that, in a sense, the links will be laid onto the ground in the form of a curved track.

By reference, particularly, to Figs. 1 and 4, it will be noted that the links of the tread chains between the traction lugs 22 are raised so as to form pockets. This causes the greatest part of the weight to be thrown directly on the traction lugs, but as the traction lugs set into soft ground, the earth will form into the pockets between the traction lugs, forming a series of ridges which very greatly increases the traction quality of the tread chains. In fact, this chain will have more than twice the traction quality of a tread chain that has flat links with ordinary lugs thereon.

By reference, particularly to Fig. 1, it will be noted that the links of the tread chains immediately before they contact with the ground, are turned downward in pairs or two at a time with the two links nearly in alignment and that under final movement thereof into contact with the ground, they are brought quickly to a position quite close to the ground and at but slight angle to the ground and that thereafter, they are slowly moved into contact with the ground, very much as if, during this final movement, they were traveling on an arc of a very large circle. The tread chains will, of course, sink considerably in soft ground and the machine must climb slightly on the tread chains that are laid upon the ground.

This application being specifically directed to the chain, the description of the drawings has been largely limited to the chain structure and the parts co-acting directly therewith, the other parts of the tractor, together with the chain are fully illustrated and described in my co-opending application hereinbefore referred to.

It will, of course, be understood that various changes may be made in the form, details and arrangement of the device without departing from the scope of my invention, which, generally stated, consists in the matter shown and described and defined in the appended claims.

What is claimed is:

1. A tractor chain for tractors comprising links carrying parts with engaging semispherical surfaces and connecting means for said links including rigid members having axes normal to each other and extending through the center of the sphere defined by said semispherical surfaces.

2. A traction chain for tractors comprising links carrying parts with engaging semispherical surfaces, and a rigid connecting member mounted in rigid relation with one of said links extending transversely of said chain and having an axis passing through the center of the sphere defined by said semispherical surfaces.

3. The structure set forth in claim 2, and another rigid connecting member mounted in rigid relation with the other link and having its axis passing through the center of the sphere defined by said semispherical surface and extending at an angle to the axis of the first mentioned member.

4. A traction belt for tractors having adjacent links comprising ground engaging means, said links being connected by rigid horizontal and vertical pivot pins, one of which is rigidly connected to one of the links, the axes of said pins intersecting at right angles.

5. A traction belt for tractors comprising links, one set of which has spaced apertured lugs, a horizontal pin rigidly secured in said lugs and extending therebetween, a vertical pin pivoted on and intersecting said horizontal pin, and a knuckle block mounted on said vertical pin.

6. A traction belt for tractors comprising one set of links having at one end semispherical heads, said heads having oppositely disposed slots through the sides thereof, a set of links respectively connected to said links, pivot pins connected to the connected links passing through said slots and having conical rollers thereon movable in said slots.

7. The structure set forth in claim 6, and bushings in said slots in which said conical rollers move.

8. The structure set forth in claim 6, and dust excluding members at each side of said slots.

9. A traction belt for tractors comprising a set of links, each of which is provided with four pairs of apertured lugs, three of which are arranged with horizontal axes, and are adapted to receive mountings for sprocket engaging rollers, bearing rollers and horizontal links connecting pivot pins respectively, and the other pair of which has a vertical axis and is adapted to receive a vertical link connecting pivot pin.

10. A traction belt for tractors comprising pairs of links, one of the links of said pairs having means adapted to engage the tractor and having ground-engaging means, the links of said pairs being connected by rigid horizontal and vertical pivot pins having their axes intersecting.

11. A traction belt for tractors comprising two series of links, connecting means for the respective links of said series, connecting said links for movement in horizontal and vertical planes about axes intersecting at right angles, one series of said links carrying bearing rollers adapted to contact with a bearing surface on the tractor to hold said links spaced from said surface.

12. A traction belt for tractors comprising two series of links, the adjacent links of said series having pairs of lugs adapted to be alined, a horizontal pivot pin traversing said lugs, one of said series of links having spaced vertical lugs and a pin traversing said lugs having its axis intersecting said horizontal pin at right angles, said links being relatively movable about both pins.

In testimony whereof I affix my signature.

ORRA L. GILLILAND.